United States Patent [19]

Petisce

[11] Patent Number: 5,000,772
[45] Date of Patent: Mar. 19, 1991

[54] METHODS OF AND APPARATUS FOR MAKING COATED OPTICAL FIBER

[75] Inventor: James R. Petisce, Norcross, Ga.

[73] Assignee: AT&T Bell Laboratories, Murray Hill, N.J.

[21] Appl. No.: 491,753

[22] Filed: Mar. 9, 1990

[51] Int. Cl.$^5$ .................... C03B 37/02; C03C 25/02
[52] U.S. Cl. ........................... 65/3.11; 65/3.4; 65/3.43; 427/47; 427/54.1; 427/163; 427/407.1
[58] Field of Search .................. 65/3.4, 3.43, 3.44, 65/3.11; 427/47, 54.1, 163, 407.1

[56] References Cited

U.S. PATENT DOCUMENTS 4,448,657 5/1984 Turro .
4,932,750 6/1990 Ansel ...................... 427/54.1

FOREIGN PATENT DOCUMENTS 341697 11/1989 European Pat. Off. ......... 427/47
1467072 3/1989 U.S.S.R. ...................... 427/47

OTHER PUBLICATIONS

Schlef; Conference: Proceedings of the 28th International Wire & Cable Symposium, Cherry Hill, N.J.; Nov. 13–15, 1979; UV Cured Resin Coating for Optical Fiber/Cable; C. L. Shlef, P. L. Narasimham, S. M. Oh; pp. 327–332.

H. Morita et al., vol. 38, Journal of Applied Polymer Science, pp. 1997–2007, (1989).

Primary Examiner—Kenneth M. Schor
Attorney, Agent, or Firm—E. W. Somers

[57] ABSTRACT

In the manufacture of coated optical fiber, fiber (21) is drawn from a preform (22) and coated with one or preferably two layers (42,44) of light curable coating materials. Afterwards, the coating materials are cured. Increases in manufacturing line speed may be achieved if the cure speed of the coating materials is increased. This is accomplished by the simultaneous application of a magnetic field during irradiation of the curable coating materials to enhance the crosslinking of the coating materials by a free radical polymerization mechanism. Upon absorption of light, a photoinitiator in each composition cleaves to produce two free radical fragments in the spin paired or singlet state. The magnetic field has the effect of enhancing the production of spin parallel radicals which enhances the polymerization initiation of the coating material, thereby allowing an increase in the manufacturing line speed through drawing and coating apparatus.

9 Claims, 6 Drawing Sheets

FIG. 1
FIG. 2
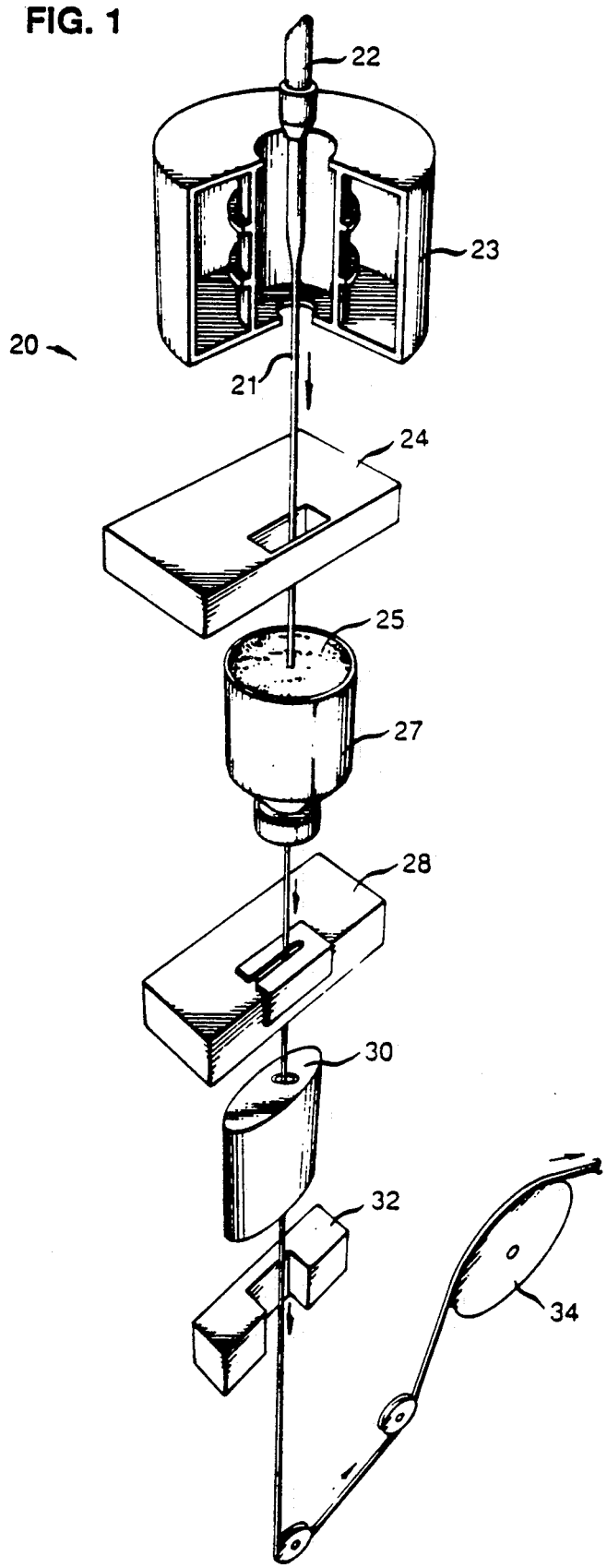
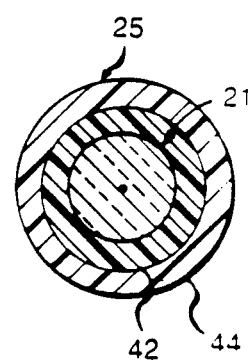

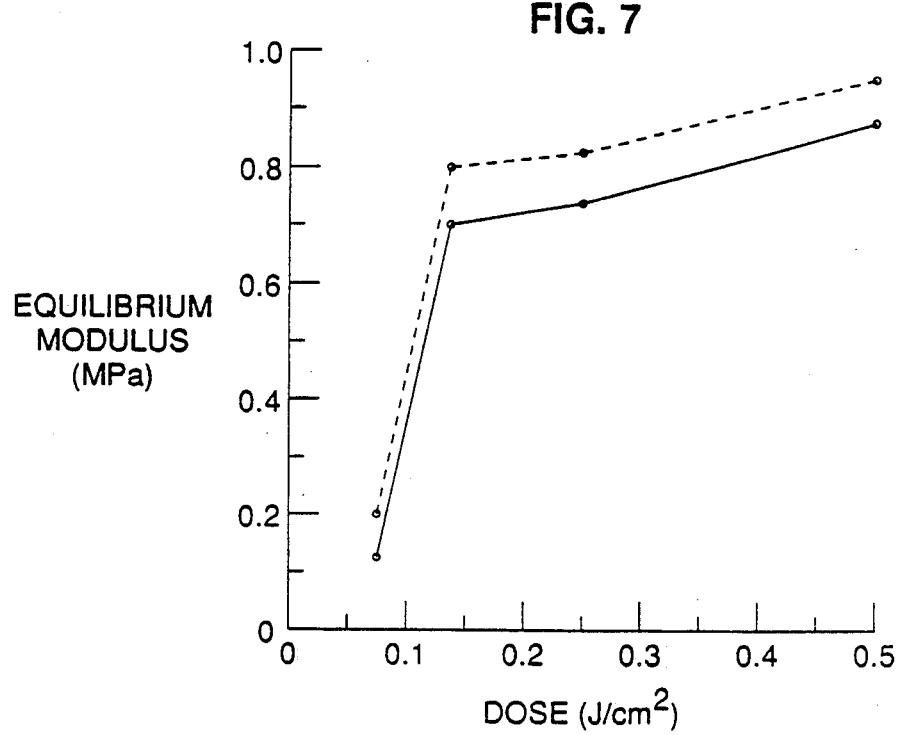
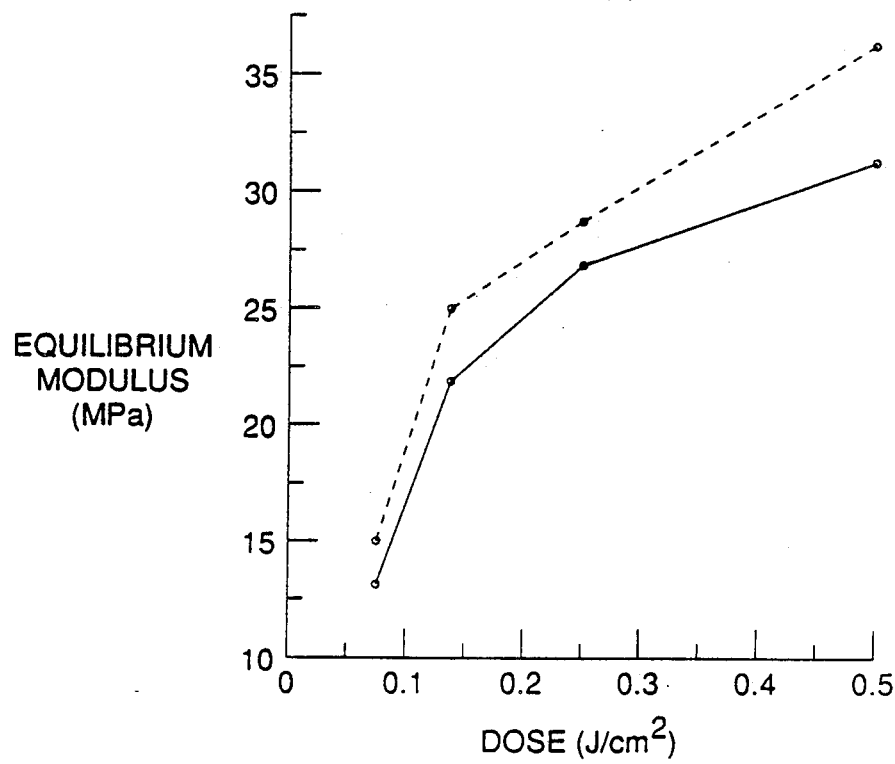

METHODS OF AND APPARATUS FOR MAKING COATED OPTICAL FIBER

TECHNICAL FIELD

This invention relates to methods of and apparatus for making coated optical fiber. More particularly, this invention relates to methods of and apparatus for coating optical fiber with enhanced cure speed.

BACKGROUND OF THE INVENTION

In the manufacture of optical fiber, a glass preform rod which generally is manufactured in a separate process is suspended vertically and moved into a furnace at a controlled rate. The preform softens in the furnace and optical fiber is drawn freely from the molten end of the preform rod by a capstan located at the base of a draw tower.

Manufacturers of optical fiber each have adapted a particular technique for the manufacture of preforms from which the optical fiber is drawn. These include outside vapor deposition and modified chemical vapor deposition, for example.

Because the surface of the optical fiber is very susceptible to damage caused by abrasion, it becomes necessary to coat the optical fiber, after it is drawn, before it comes into contact with any surface. Inasmuch as the application of a coating material must not damage the glass surface, the coating material is applied in a liquid state. Once applied, the coating material must become solidified rapidly before the optical fiber reaches the capstan. This may be accomplished by photocuring, for example.

Those optical fiber performance properties which are affected most by the coating material are strength and transmission loss. Coating defects which may expose the optical fiber to subsequent damage arise primarily from improper application of the coating material. Defects such as large bubbles or voids, non-concentric coatings with unacceptably thin regions, or intermittent coatings must be prevented. The problem of bubbles in the coating material has been overcome. See, for example, U.S. Pat. No. 4,851,165 which issued on July 25, 1989 in the names of J. A. Rennell, Jr. and C. R. Taylor. Intermittent coating is overcome by insuring that the fiber is suitably cool at its point of entry into the coating applicator to avoid coating flow instabilities. Coating concentricity can be monitored and adjustments made to maintain an acceptable value.

Optical fibers are susceptible to a transmission loss mechanism known as microbending. Because the fibers are thin and flexible, they are readily bent when subjected to mechanical stresses, such as those encountered during placement in a cable or when the cabled fiber is exposed to varying temperature environments or mechanical handling. If the stresses placed on the fiber result in a random bending distortion of the fiber axis with periodic components in the millimeter range, light rays, or modes, propagating in the fiber may escape from the core. These losses, termed microbending losses, may be very large, often many times the intrinsic loss of the fiber itself. The optical fiber must be isolated from stresses which cause microbending. The properties of the optical fiber coating material play a major role in providing this isolation, with coating geometry, modulus and thermal expansion coefficient being the most important factors.

Typically two layers of coating materials are applied to the drawn optical fiber. Furthermore, two different kinds of coating materials are used commonly. An inner layer which is referred to as a primary coating material is applied to be contiguous to the optical glass fiber. An outer layer which is referred to as a secondary coating material is applied to cover the primary coating material. Usually, the secondary coating material has a relatively high modulus, e.g. $10^9$ Pa, whereas the primary coating material as a relatively low modulus such as, for example, $10^6$ Pa. In one arrangement, the primary and the secondary coating materials are applied simultaneously. Such an arrangement is disclosed in U.S. Pat. No. 4,474,830 which issued on Oct. 2, 1984 in the name of C. R. Taylor.

Subsequently, both the inner and the outer layers of coating materials are cured beginning from the outside progressing inwardly. Also typically, the primary and the secondary coating materials comprise ultraviolet light curable materials each being characterized by a photoactive region. A photoactive region is that region of the light spectrum which upon the absorption of curing light causes the coating material to change from a liquid material to a solid material. Both the materials which have been used for the primary and for the secondary materials have comparable photoactive regions. Because the photoactive regions are comparable, the curing light for the primary coating material will be attenuated by the secondary coating material. As a result of the attenuation, less light reaches the primary coating material.

Of course, notwithstanding the attenuation of the curing light by the secondary coating material, it is important that the primary coating material be fully cured. This problem has been overcome in the prior art by reducing the line speed to allow longer exposure time of the primary coating material to the ultraviolet curing light energy inasmuch as the ultraviolet curing light energy is inversely proportional to line speed.

Although the foregoing solution is a workable one, it has its shortcomings. Most importantly, any reduction in line speed is not desirable and runs counter to current efforts to increase draw lengths and to increase substantially draw speeds of the optical fiber.

What is needed and seemingly what is not disclosed in the prior art is a coated optical fiber which overcomes the foregoing problem of attenuation by the secondary coating material of the light energy used to cure the primary coating material without compromising line speed.

The foregoing problem has been exacerbated because, presently, optical fiber manufacturers are attempting to provide larger preforms to allow the drawing of a longer length of fiber from each preform. Also, there is a strong desire to decrease the time required to cure the coating materials. Should this desire be realized, then increases in line speed could be achieved.

Any solution to the problem of increased cure speed desirably is accomplished without changing the composition of the coating materials. Should those materials be changed, expensive, time consuming testing would have to be carried out to requalify the coating system. Also, any increase in cure speed desirably should be carried out without the addition of curing lamps or without the lengthening of the curing portion of the manufacturing line.

More particularly, what is needed and what seemingly is not available in the prior art is a coating arrangement for increasing the cure speed of coating materials for optical fiber. The sought-after methods and apparatus should be capable of being integrated into existing optical fiber draw lines and should be able to be implemented without the need to change the chemical composition of the coating materials of the coating system.

SUMMARY OF THE INVENTION

The foregoing problems of the prior art have been overcome by the methods and apparatus of this invention. In a method of making optical fiber, fiber is drawn from a preform and provided with one or preferably two layers of coating material. Each of the coating materials is an ultraviolet light curable composition of matter or a visible light curable composition may be used. After the coating materials have been applied to the drawn fiber, the coating materials are cured. Then the drawn coated fiber is taken up.

In order to increase the cure speed of the coating layers, the coating materials are exposed to a magnetic field at the same time they are exposed to ultraviolet light. The magnetic field has the effect of enhancing the production of spin parallel radicals from a photoinitiator which has been promoted to its excited state by absorption of ultraviolet light. As a result, the polymerization initiation of the coating material is enhanced, allowing the overall cure speed to be increased.

BRIEF DESCRIPTION OF THE DRAWING

Other features of the present invention will be more readily understood from the following detailed description of specific embodiments thereof when read in conjunction with the accompanying drawings, in which:

FIG. 1 is a schematic view of a manufacturing line for drawing and coating optical fiber;

FIG. 2 is an end view in section of an optical fiber having a coating system thereon;

FIGS. 7 and 8 are graphs depicting equilibrium modulus versus dose of two other optical fiber ultraviolet light curable coating materials with and without being subjected to a magnetic field during cure;

DETAILED DESCRIPTION

Figure 3:
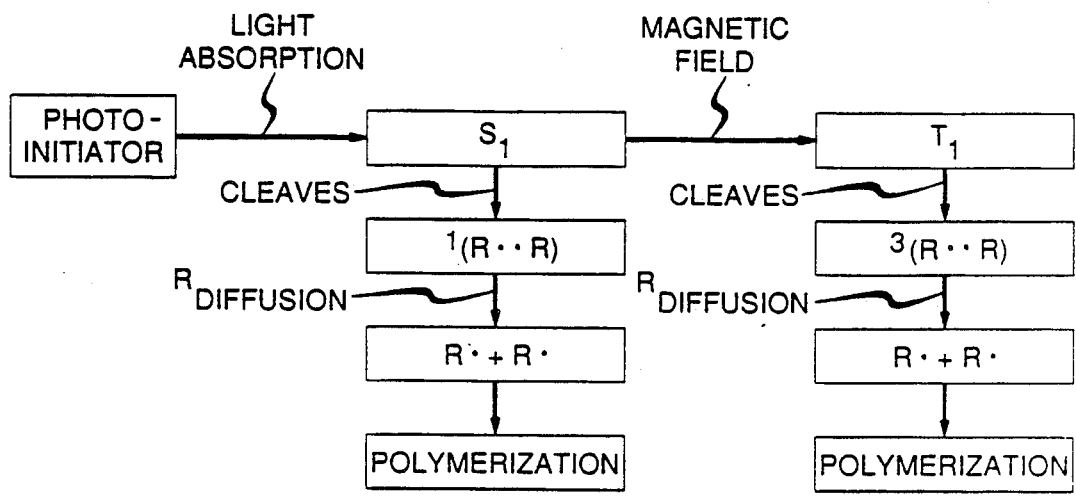
FIG. 3 is a diagram to show a free radical polymerization mechanism for a photoinitiator.

Referring now to FIG. 1, there is shown an apparatus which is designated generally by the numeral 20 and in which is used to draw optical fiber 21 from a specially prepared cylindrical preform 22 and for then coating the drawn fiber. The optical fiber 21 is formed by locally and symmetrically heating the preform 22, typically 7 to 25 mm in diameter and 60 cm in length, to a temperature of about 2000°C. As the preform is fed into and through a furnace 23, fiber 21 is drawn from the molten material.

As can be seen in FIG. 1, the elements of the draw system include the furnace 23 wherein the preform is drawn down to the fiber size after which the fiber 21 is pulled from a heat zone therein. The diameter of the fiber 21 is measured by a device 24 at a point shortly after the fiber is formed and this measured value becomes an input into a control system. Within the control system, the measured diameter is compared to the desired value and an output signal is generated to adjust the draw speed such that the fiber diameter approaches the desired value.

After the diameter of the optical fiber 21 is measured, a protective coating system 25 (see also FIG. 2) is applied to the fiber by an apparatus 27. Preservation of fiber strength requires the application of the protective coating, which shields newly drawn fiber from the deleterious effects of the atmosphere. This coating system must be applied in a manner that does not damage the surface of the fiber 21 and such that the fiber has a predetermined diameter and is protected from abrasion during subsequent manufacturing operations, installation and service. Minimizing attenuation requires the selection of a suitable coating material and a controlled application of it to the fiber. Such a coating apparatus may be one such as that described in priorly identified U.S. Pat. No. 4,474,830. Minimizing diameter variation which in turn minimizes the losses due to misalignment at connector and splice points requires careful design of the draw system and the continuous monitoring and control of the fiber diameter during the drawing and the coating steps of the process. Then, the coated fiber 21 is passed through a centering gauge 28.

After the coating materials have been applied to the drawn fiber, the coating materials must be cured. Accordingly, the optical fiber having the coating materials thereon is passed through a curing chamber 30 for curing the coating system and a device 32 for measuring the outer diameter of the coated fiber. Afterwards, it is moved through a capstan 34 and is spooled for testing and storage prior to subsequent cable operations.

In the apparatus 27, the coating system 25 comprising two coating materials is applied to the optical fiber. The coating system 25 includes an inner layer 42 (see FIG. 2) which often is referred to as a primary coating material and an outer layer 44 which often is referred to as a secondary coating material. The coating material of the inner layer which has a substantially lower modulus than that of the outer layer, is such that it prevents microbending of the optical glass fiber. On the other hand, the higher modulus outer layer provides mechanical protection for the drawn glass fiber.

Each of the coating materials is curable by being exposed to a portion of the light spectrum. It is commonplace to use ultraviolet light curable coating materials which are crosslinked by a free radical polymerization mechanism. Generally each of the coating materials includes an oligomer, a diluent and a photoinitiator. Also included may be additives such as, for example, antioxidants, adhesion promoters, ultraviolet (UV) light stabilizers, surfactants and shelf life stabilizers.

A first step in such a polymerization mechanism is the absorption of incident ultraviolet irradiation by the photoinitiator constituent of each coating composition (see FIG. 3). The photoinitiator upon exposure to suitable light energy is promoted to an excited singlet state which is a precursor for a caged singlet radical pair. Subsequently, the photoinitiator of each coating material in its excited singlet state cleaves to produce a caged radical pair, which is usually in the spin paired or singlet state.

In order to initiate polymerization, the two radical fragments must diffuse apart from each other and react with other constituents of the fiber coating materials. The radicals must diffuse out of the cage.

Subsequently, the radicals diffuse from one another and interact with coating material such as acrylates, for example, that can undergo free radical polymerization. Some of the photoinitiator in the excited singlet state is converted to a triplet state by a process which is referred to as intersystem crossing. This conversion results in a population of the excited triplet state. Upon cleavage from the excited triplet state, a triplet or spin parallel radical pair is formed. Radicals diffuse from one another to interact with materials such as acrylates, for example, that are capable of undergoing radical polymerization.

For polymerization to occur, radicals must move out of an associated cage by diffusion which is much faster for a triplet radical pair than for a singlet radical pair. Because the free electrons of radicals in the singlet radical pair are spin paired, they are poised to cause bonding. In contrast, free electrons in a triplet radical pair are spin parallel. Because spin parallel radicals repulse one another, their recombination is reduced. Also, because spin parallel or triplet radical pairs repulse one another, the rate of diffusion of the caged radicals produced from the excited triplet state on the right of FIG. 3 is higher than for the singlet stage. As a result, the photoinitiator radicals from the triplet radical pairs are more readily available to initiate polymerization. The diffusion rate of the triplet radicals from one another is enhanced to combine with other components to cause crosslinking.

Unfortunately, the efficiency of the diffusion of the two radical fragments from each other and hence the rate of polymerization is reduced by the propensity of the free radical pair which are in the singlet state to combine with each other. As a result, a rate determining step in the manufacture of optical fiber is the curing speed of the ultraviolet light curable coating materials.

Long sought after has been a way in which to increase the cure speed. One way in which to do this is to increase the rate of polymerization of the coating material which has been applied to the drawn optical fiber.

This problem of achieving an increased cure speed has been overcome by the application of a magnetic field to the optical fiber coating simultaneously with the exposure of the two layers of coating materials to ultraviolet light energy for curing. The exposure to the magnetic field is effective to cause the excited singlet state of the photoinitiator to be converted to its excited triplet state. The free radical pair derived from the singlet state will be spin paired and the free radical pair derived from the triplet state will be spin parallel. Because diffusion efficiency of the triplet radical pair fragments from one another is substantially greater than the diffusion efficiency of the singlet radical pair fragments from one another, the cure speed of material systems which can undergo free radical polymerization, such as optical fiber coatings, for example, and hence the production rate of systems which can undergo free radical polymerization such as optical fiber coatings is enhanced greatly by the application of a magnetic field simultaneously with the irradiation curing of the coating layers.

Although recombination can occur in a triplet radical cage through a mechanism referred to as spin flip, recombination in a triplet radical cage is not nearly as apt to occur as in a singlet radical cage. A more efficient escape of photoinitiator radicals from one another allows a more efficient initiation of polymerization. The diffusion and hence the polymerization is much more rapid from the triplet radical pair than from the singlet radical pair. When the photoinitiator is subjected to a magnetic field at the same time it is exposed to curing energy, the magnetic field enhances intersystem crossing from the singlet state to a triplet state. The magnetic field may be such as to provide a higher rate of intersystem crossing and thus serves to increase the concentration of free radicals.

The polymerization of the coating materials is greatly enhanced by the exposure of the coating materials to a magnetic field simultaneously with exposure to light curing energy. As a result, the curing of the coating materials of the inner and outer layers is accelerated, which advantageously allows an increase in speed of the fiber draw line.

Figure 4:
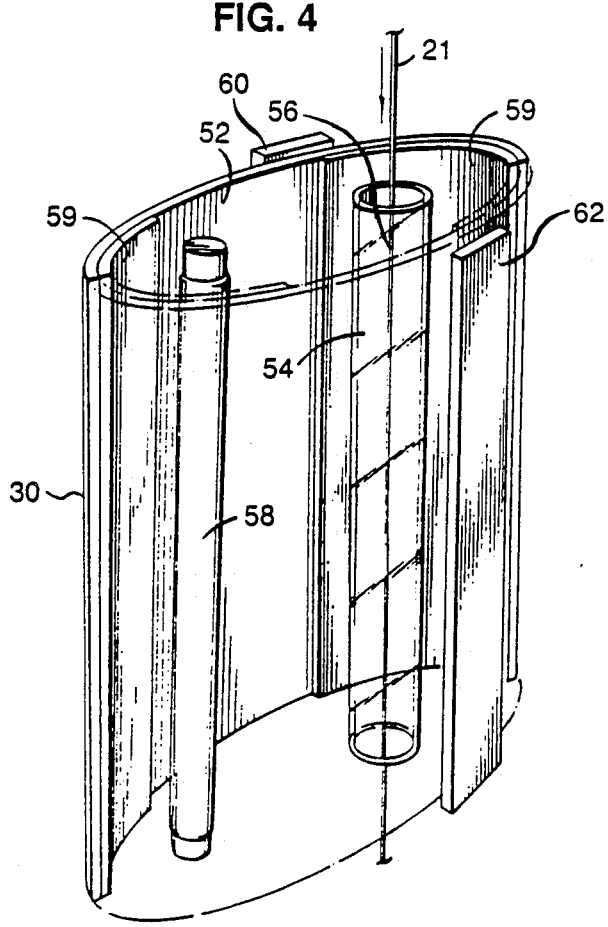
FIG. 4 is a perspective view partially in phantom of a curing chamber in which coating materials on drawn optical fiber are cured and exposed to a magnetic field during cure.

The curing chamber 30 provides such enhanced curing of the coating material or materials. Typically, the curing chamber 30 (see FIG. 4) is provided with a housing 52. Disposed within the housing 52 is a quartz tube 54 having a longitudinal axis 56 parallel to that of the housing. The quartz tube 54 is adapted to have the drawn optical fiber 21 moved therethrough and has an inner diameter of about 2.5 cm and a thickness of about 1 mm. Also disposed within the chamber 30 is an elongated quartz halogen lamp 58 which parallels the path of the optical fiber and which emits ultraviolet radiation that is used to cure the coating material or materials. The lamp 58 and the quartz tube 54 through which the fiber is moved are located at the focii of elliptical mirrors 59—59 to ensure that substantially all of the periphery of a moving optical fiber is impinged by light emitted by the lamp 58.

The quartz tube 54 through which the optical fiber is moved is transparent to ultraviolet radiation from the lamp. Consequently, the use of such a tube does not impair the curing of the coating material on the moving optical fiber. The ultraviolet curing of the coating materials on the optical fiber is accomplished with energy in the wavelength range of about 200 to 400 nm.

Positioned adjacent to the exterior of the curing chamber 30 is a magnet system 60. The magnet system may comprise two bar magnets 62—62 or electromagnets which are aligned with the quartz tube 54. Because the magnets are positioned outside the chamber 30, they do not interfere with the reflected light and hence do not impair the curing step.

Figure 5:
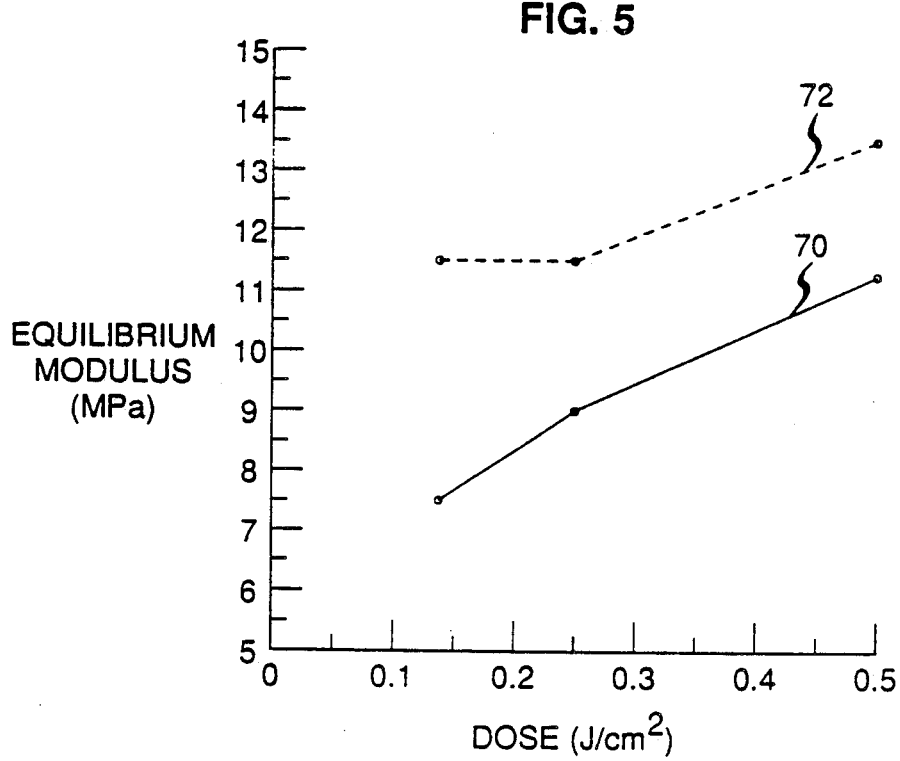
FIG. 5 is a graph which depicts equilibrium modulus versus dose of an optical fiber UV curable ink with and without being subjected to a magnetic field during cure.
Figure 6:
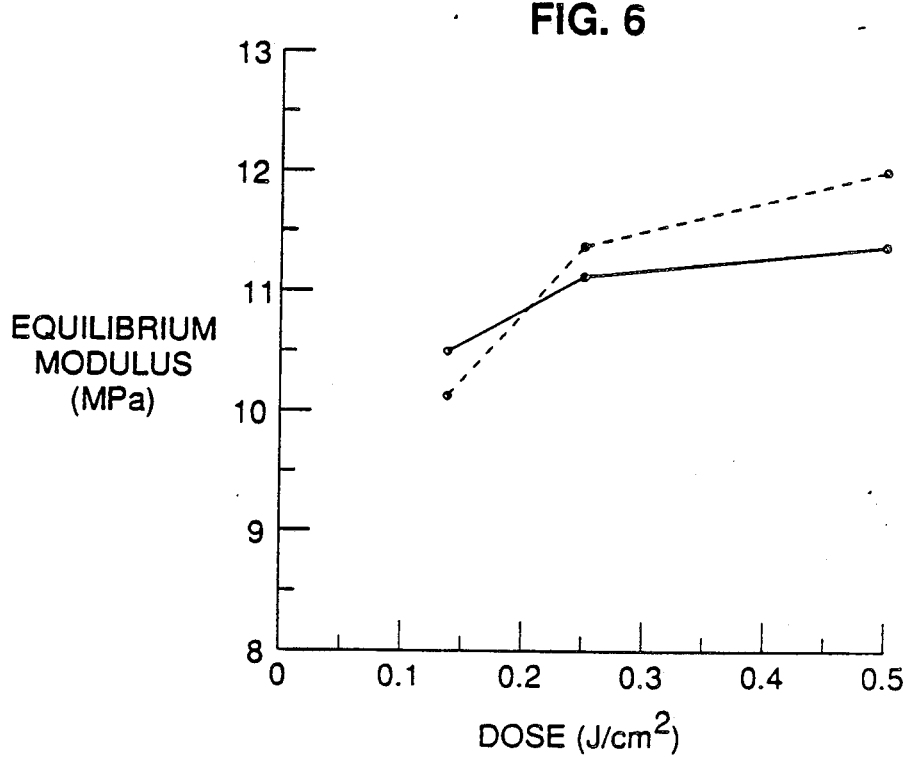
FIG. 6 is a graph which depicts equilibrium modulus versus dose of an optical fiber ultraviolet light curable coating material with and without being subjected to a magnetic field during cure.

Referring now to FIG. 5, there is shown a comparison of the equilibrium modulus of a UV curable ink achieved at different UV dose levels with and without the simultaneous application of a magnetic field. A curve designated 70 represents the plot for the curing of the coating materials without exposure to a magnetic field. A curve designated 72 represents the plot for the curing of the coating materials with the simultaneous exposure to a magnetic field. FIGS. 6, 7, and 8 depict different equilibrium modulus levels of optical fiber UV curable coating materials at varying UV dose levels with and without the simultaneous exposure to a magnetic field. In FIGS. 5, 6 and 7, the broken lines at enhanced levels represent coating material subjected simultaneously to curing light energy and to a magnetic field.

Figure 9:
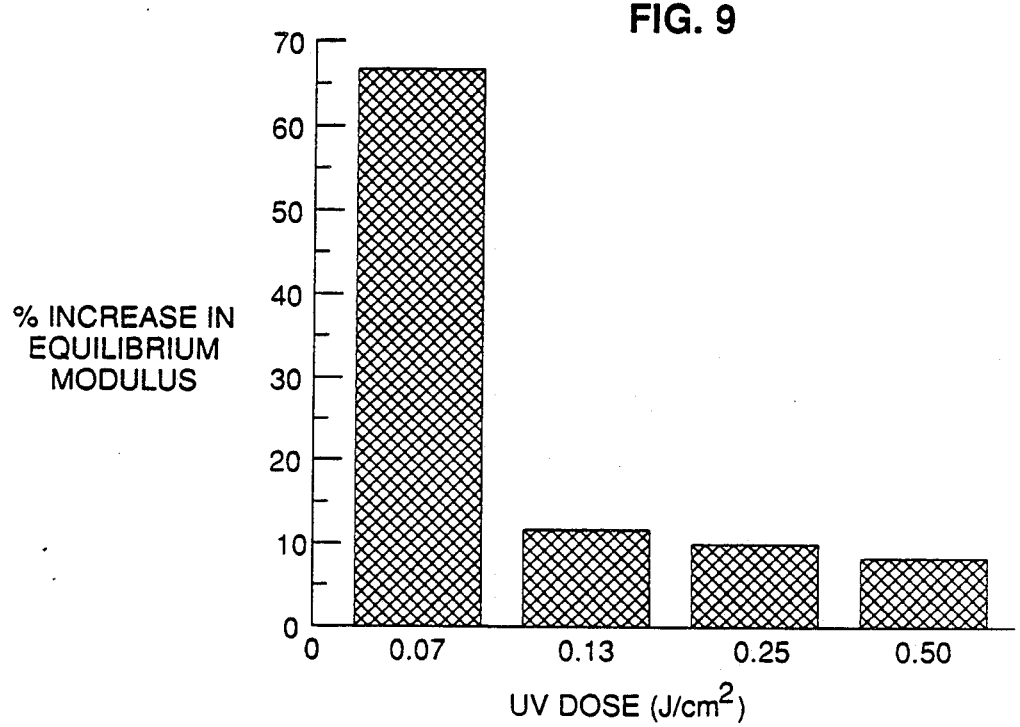
FIGS. 9 and 10 are histograms which show the increase is equilibrium modulus of optical fiber coating materials due to the application of a magnetic field during cure at increasing levels of UV dose.
Figure 10:
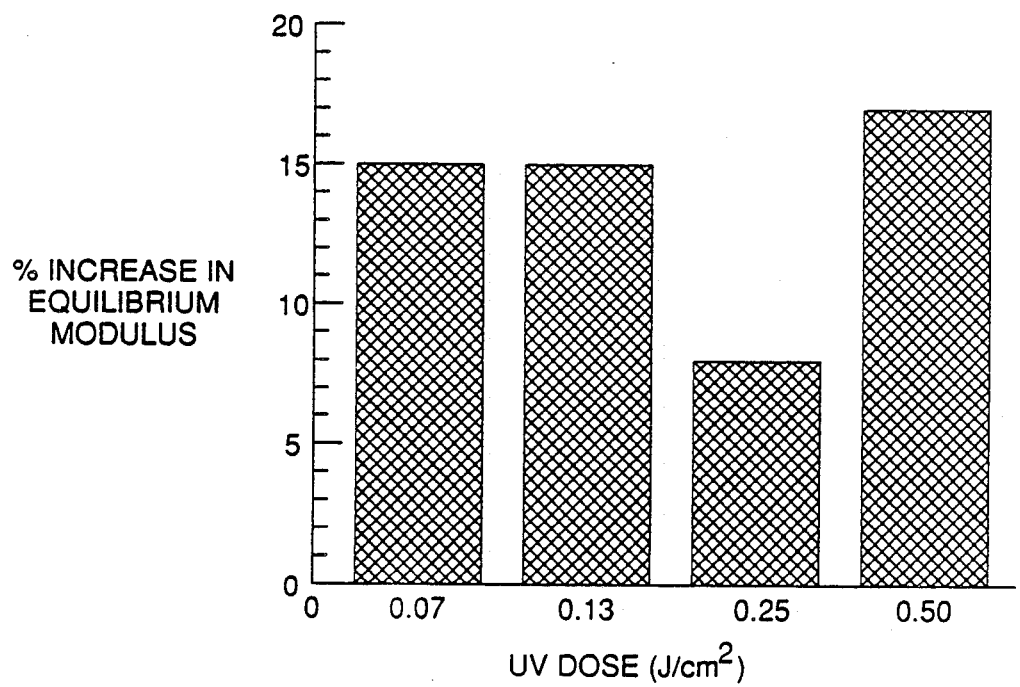
Figure 11:
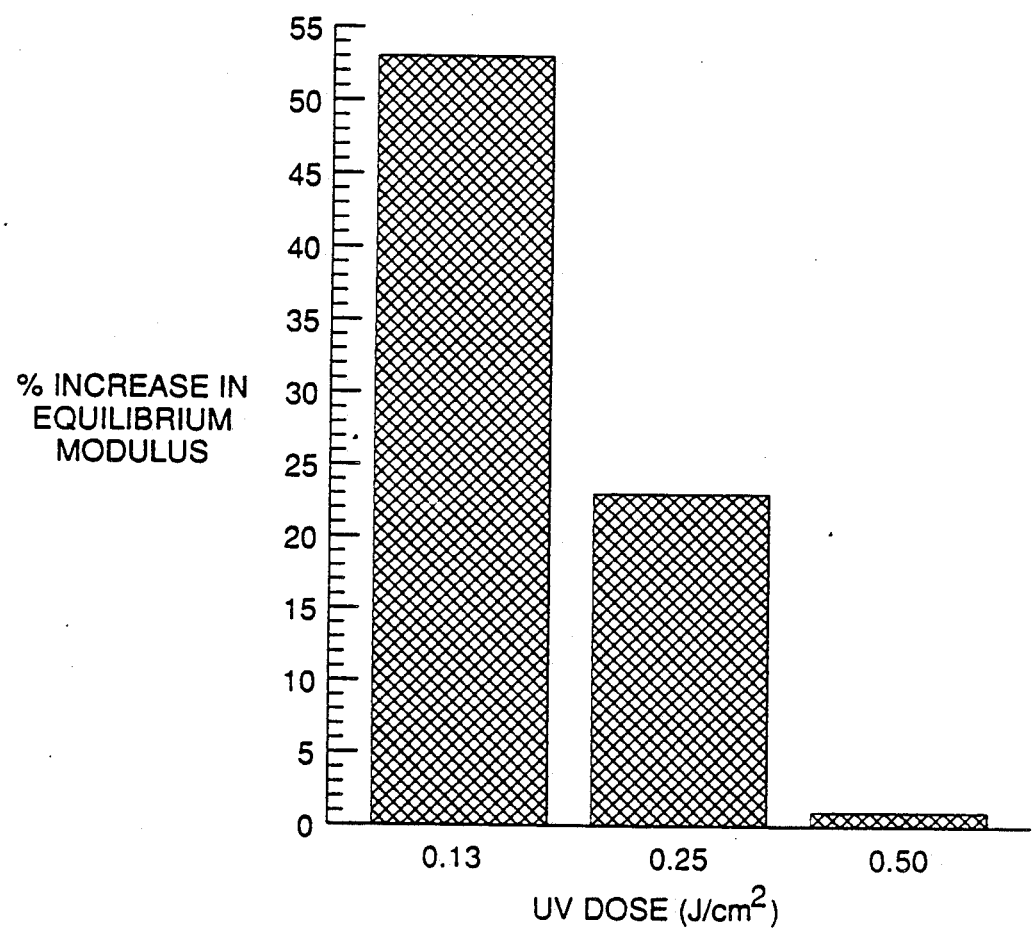
FIG. 11 is a histogram which shows the increase in equilibrium modulus of an optical fiber ink due to the application of a magnetic field during cure at increasing levels of UV dose.

Histograms in FIGS. 9 and 10 depict the percentage increase in equilibrium modulus of optical fiber coating materials with the simultaneous application of a magnetic field at varying UV dose levels. The histogram in FIG. 11 depicts the percentage increase in equilibrium modulus of a UV curable ink with the simultaneous application of a magnetic field.

Although this invention has been described in terms of enhancing the cure speed of optical fiber coatings, the invention is not so limited. For example, it would be used to alter the cure speed of light curable materials which have been applied to any substrate material such as floor coverings, for example.

It is to be understood that the above-described arrangements are simply illustrative of the invention. Other arrangements may be devised by those skilled in the art which will embody the principles of the invention and fall within the spirit and scope thereof.

I claim:

1. A method of producing optical fiber, said method include the steps of:
   providing an optical preform;
   suspending the optical preform from a suspending means, such that the preform can be drawn;
   drawing optical fiber from the suspended preform while the preform is subjected to fiber-drawing heat energy;
   applying at least two layers of a light-curable polymerizable coating material to the drawn fiber where the outer of the two layers attenuates curing light energy directed through it to the inner layer;
   exposing the drawn coated fiber to light energy to cure the coating material and thereby polymerize it; while
   simultaneously exposing the drawn coated fiber to a magnetic field to thereby increase the speed of the curing of the coating material; and
   taking up the drawn coated optical fiber.

2. The method of claim 1, wherein said magnetic field has a strength of at least about 2000 Gauss and is sufficient to afford significant enhancement of polymerization of said at least one coating material.

3. The method of claim 1, wherein the coating material is one which is converted from a liquid to a solid by free radical polymerization.

4. The method of claim 3, wherein the coating material is a visible light curable material.

5. The method of claim 3, wherein the coating material is an ultraviolet light curable material.

6. The method of claim 1, wherein an inner layer and an outer layer of coating material are applied to the optical fiber.

7. The method of claim 6, wherein the inner and the outer layers of coating materials are applied simultaneously.

8. The method of claim 6, wherein the inner and the outer layers of coating materials are applied successively.

9. The method of claim 1, wherein the optical fiber is exposed to the curing energy for a time suitable for achieving a predetermined dose level.

* * * * *